US009977515B2

(12) United States Patent
Ichieda

(10) Patent No.: US 9,977,515 B2
(45) Date of Patent: *May 22, 2018

(54) DISPLAY DEVICE, PROJECTOR, AND DISPLAY METHOD

(71) Applicant: Seiko Epson Corporation, Tokyo (JP)

(72) Inventor: Hiroyuki Ichieda, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/660,045

(22) Filed: Jul. 26, 2017

(65) Prior Publication Data

US 2017/0322636 A1    Nov. 9, 2017

Related U.S. Application Data

(63) Continuation of application No. 14/513,600, filed on Oct. 14, 2014, now Pat. No. 9,746,940, which is a
(Continued)

(30) Foreign Application Priority Data

Sep. 20, 2011  (JP) ................................ 2011-204289

(51) Int. Cl.
*G06F 3/033*  (2013.01)
*G06F 3/0354*  (2013.01)
(Continued)

(52) U.S. Cl.
CPC .......... *G06F 3/033* (2013.01); *G06F 3/03545* (2013.01); *G06F 3/0418* (2013.01); *G06F 3/0425* (2013.01)

(58) Field of Classification Search
None
See application file for complete search history.

(56) References Cited

U.S. PATENT DOCUMENTS 6,262,718 B1    7/2001  Findlay et al.
6,346,962 B1    2/2002  Goodridge
(Continued)

FOREIGN PATENT DOCUMENTS

JP    S62-198197 A    7/1987
JP    H06-035607 A    2/1994
(Continued)

OTHER PUBLICATIONS

Non-Final Office Action received in U.S. Appl. No. 13/604,727; dated Mar. 27, 2014.
(Continued)

*Primary Examiner* — Nicholas Lee
(74) *Attorney, Agent, or Firm* — ALG Intellectual Property, LLC

(57) ABSTRACT

A display device including an image input unit that receives image data from an image supply device, a display unit that displays a display image on a display surface based on image data, a location detection unit that detects a pointed location with respect to the display image on the display surface, a coordinate calculation unit that calculates first coordinates as coordinates of the pointed location in a displayable area on the display surface, a drawing unit that draws an image based on the first coordinates calculated by the coordinate calculation unit, and an output unit that outputs the coordinates to the image supply device based on the first coordinates.

12 Claims, 10 Drawing Sheets

Related U.S. Application Data continuation of application No. 13/604,727, filed on Sep. 6, 2012, now Pat. No. 8,878,801.

(51) Int. Cl.
*G06F 3/041* (2006.01)
*G06F 3/042* (2006.01)

(56) References Cited

U.S. PATENT DOCUMENTS

| | | |
|---|---|---|
| 7,113,168 B2 | 9/2006 | Oya et al. |
| 2002/0122075 A1 | 9/2002 | Karasawa et al. |
| 2003/0021492 A1 | 1/2003 | Matsuoka et al. |
| 2006/0007177 A1 | 1/2006 | Mclintock |
| 2008/0192017 A1 | 8/2008 | Hildebrandt et al. |
| 2011/0267260 A1 | 11/2011 | Jang et al. |
| 2012/0044140 A1 | 2/2012 | Koyama et al. |

FOREIGN PATENT DOCUMENTS

| | | |
|---|---|---|
| JP | 2002-140058 A | 5/2002 |
| JP | 2004-272433 A | 9/2004 |
| JP | 2005-092592 A | 4/2005 |
| JP | 2008-3802 A | 1/2008 |
| JP | 4272904 B | 6/2009 |

OTHER PUBLICATIONS

Notice of Allowance and Notice of Allowability received in U.S. Appl. No. 13/604,727; dated Aug. 1, 2014.
Non-Final Office Action received in U.S. Appl. No. 14/513,600, dated Apr. 22, 2015.
Final Office Action received in U.S. Appl. No. 14/513,600, dated Jan. 15, 2016.
Non-Final Office Action received in U.S. Appl. No. 14/513,600, dated May 6, 2016.
Non-Final Office Action received in U.S. Appl. No. 14/513,600, dated Oct. 28, 2016.
Notice of Allowance and Notice of Allowability received in U.S. Appl. No. 14/513,600, dated May 15, 2017.

DISPLAY DEVICE, PROJECTOR, AND DISPLAY METHOD

CROSS-REFERENCE

The present application is a continuation of U.S. patent application Ser. No. 14/513,600 filed Oct. 14, 2014, which claims priority from U.S. patent application Ser. No. 13/604,727 filed Sep. 6, 2012 (now U.S. Pat. No. 8,878,801), which claims priority from Japanese Patent Application No. 2011-204289 filed Sep. 20, 2011, which are hereby incorporated by reference in their entirety.

BACKGROUND

1. Technical Field

The present invention relates to a display device that outputs information of a pointed location, a projector, and a display method.

2. Related Art

In related art, when a specific location of an image displayed by a display device such as a projector is pointed, a device of detecting the pointed location and displaying a pointer or the like in response to the detected location has been known (for example, see Patent Document 1 (Japanese Patent No. 4272904)). In this type of device, it is necessary to perform calibration so that the pointed location and the display location of the pointer or the like may coincide with each other. Generally, it is necessary to recalibrate at each time when the display condition changes in such a way that the display location of the displayed image changes, and lots of effort is required. Accordingly, in the device disclosed in Patent Document 1, when the display location changes, location change data indicating a location relationship between before and after the change is used, and thereby, the calibration is omitted.

In the device disclosed in Patent Document 1, when the display condition changes, data indicating a relationship between before and after the change is necessary. There are a wide variety of changes of display conditions in the display device, and it is not easy to prepare data indicating relationships between before and after the changes in advance. Accordingly, in the device disclosed in Patent Document 1, at each time when the display condition changes, data indicating a relationship between before and after the change is calculated, however, there has been a problem that the processing of calculating the data is complex and its load is greater, and thus, high arithmetic processing performance is required.

SUMMARY

An advantage of some aspects of the invention is to provide a display device, a projector, and a display method that can reduce an execution frequency of calibration when a pointed location on a displayed image is detected.

An aspect of the invention is directed to a display device including a display unit that displays a display image on a display surface based on image data, a location detection unit that detects a pointed location with respect to the display image on the display surface, a coordinate calculation unit that calculates first coordinates as coordinates of the pointed location in a displayable area within the display surface, a coordinate conversion unit that converts the first coordinates calculated by the coordinate calculation unit into second coordinates as coordinates in the image data, and an output unit that outputs the second coordinates obtained by the coordinate conversion unit.

According to this aspect of the invention, the coordinates of the pointed location with respect to the display image displayed on the display surface based on the image data are output as the coordinates in the image data, and thus, in equipment using the output coordinates, the relative position between the pointed location and the image data may be specified without being affected by the display mode of display resolution, the largeness of the display area, or the like. In the process of obtaining the coordinates of the pointed location in the image data, it is not necessary to directly associate the image data itself with the pointed location, and it is not necessary to perform calibration even when the size of the image data or the like is changed. Therefore, the execution frequency of the calibration may be reduced.

Another aspect of the invention is directed to the display device described above, wherein the coordinate conversion unit converts the first coordinates calculated by the coordinate calculation unit into the second coordinates based on image location information as information indicating a location of the display image with respect to the displayable area.

According to this aspect of the invention, even when the image location information as the information indicating the location of the display image with respect to the displayable area changes, the coordinates of the pointed location may be correctly converted and output.

Still another aspect of the invention is directed to the display device described above, wherein the coordinate conversion unit converts the first coordinates calculated by the coordinate calculation unit into the second coordinates based on resolution of the image data.

According to this aspect of the invention, even when the resolution of the image data changes, the coordinates of the pointed location may be correctly converted and output.

Yet another aspect of the invention is directed to the display device described above, wherein the location detection unit detects a location of a pointing tool on the display surface using an imaging unit, and thereby, detects the pointed location in the displayable area.

According to this aspect of the invention, the pointed location may be promptly detected based on a taken image obtained by imaging of the display surface.

Still yet another aspect of the invention is directed to the display device described above, wherein the coordinate conversion unit uses coordinates of a location near the pointed location in the image data as converted coordinates when the pointed location is not contained in the display image.

According to this aspect of the invention, even when the location where no image is displayed is pointed, the coordinates of the pointed location may be output. Further, the output coordinates are the coordinates of the location near the pointed location, and may be processed in the same manner as that for the coordinates of the pointed location.

Further another aspect of the invention is directed to the display device described above, wherein the coordinate conversion unit does not output converted coordinates when the pointed location is not contained in the display image.

According to this aspect of the invention, the coordinates corresponding to the pointed location are output only when an area with the display image is pointed, and thus, an operation in response to only the pointing on the location overlapping with the image may be performed.

Still further another aspect of the invention is directed to the display device described above, wherein, when image processing is executed on the image data and a display mode of the display image on the display surface is changed, the coordinate conversion unit converts the first coordinates into the second coordinates based on the image location information changed in response to the display mode.

According to this aspect of the invention, proper coordinates may be constantly output with the change in display mode of the display image.

Yet further another aspect of the invention is directed to a projector including a light modulator that modulates light generated by a light source, an image forming unit that forms a display image in a drawing area of the light modulator based on image data, a projection unit that projects the display image formed by the image forming unit on a projection surface, a location detection unit that detects a pointed location with respect to the display image on the projection surface, a coordinate calculation unit that calculates first coordinates as coordinates of the pointed location in a projection area on the projection surface, a coordinate conversion unit that converts the first coordinates calculated by the coordinate calculation unit into second coordinates as coordinates in the image data, and an output unit that outputs the second coordinates obtained by the coordinate conversion unit.

According to the projector of the aspect of the invention, the coordinates of the pointed location with respect to the display image projected on the projection surface based on the image data are output as the coordinates in the image data, and thus, in equipment using the output coordinates, the relative position between the pointed location and the image data may be specified without being affected by the display mode of display resolution, the largeness of the display area, or the like. In the process of obtaining the coordinates of the pointed location in the image data, it is not necessary to directly associate the image data itself with the pointed location, and it is not necessary to perform calibration even when the size of the image data or the like is changed. Therefore, the execution frequency of the calibration may be reduced.

Still yet further another aspect of the invention is directed to a display method including displaying a display image on a display surface based on image data, detecting a pointed location with respect to the displayed display image, calculating first coordinates as coordinates of the pointed location in a displayable area within the display surface, converting the calculated first coordinates into second coordinates as coordinates in the image data, and outputting the second coordinates obtained by the conversion.

According to this aspect of the invention, the coordinates of the pointed location with respect to the display image displayed on the display surface based on the image data are output as the coordinates in the image data, and thus, in equipment using the output coordinates, the relative position between the pointed location and the image data may be specified without being affected by the display mode of display resolution, the largeness of the display area, or the like. In the process of obtaining the coordinates of the pointed location in the image data, it is not necessary to directly associate the image data itself with the pointed location, and it is not necessary to perform calibration even when the size of the image data or the like is changed. Therefore, the execution frequency of the calibration may be reduced.

A further another aspect of the invention is directed to a program that can be executed by a computer that controls a display device of displaying a display image on a display surface based on image data, and allows the computer to function as a location detection unit that detects a pointed location with respect to the display image on the display surface, a coordinate calculation unit that calculates first coordinates as coordinates of the pointed location in a displayable area within the display surface, a coordinate conversion unit that converts the first coordinates calculated by the coordinate calculation unit into second coordinates as coordinates in the image data, and an output unit that outputs the second coordinates obtained by the coordinate conversion unit.

The program may be implemented as a recording medium in which the program is recorded in a computer-readable form.

According to the aspects of the invention, the coordinates of the pointed location with respect to the display image displayed on the display surface may be output as the coordinates in the image data without direct association of the image data itself with the pointed location, and the execution frequency of the calibration may be reduced.

BRIEF DESCRIPTION OF THE DRAWINGS

The invention will be described with reference to the accompanying drawings, wherein like numbers reference like elements.

FIG. 4A shows a state in which a pointer is projected according to a pointed location and FIG. 4B shows an example in which drawing is performed according to the pointed location.

DESCRIPTION OF EXEMPLARY EMBODIMENTS

As below, embodiments to which the invention is applied will be explained with reference to the drawings.

Figure 1:
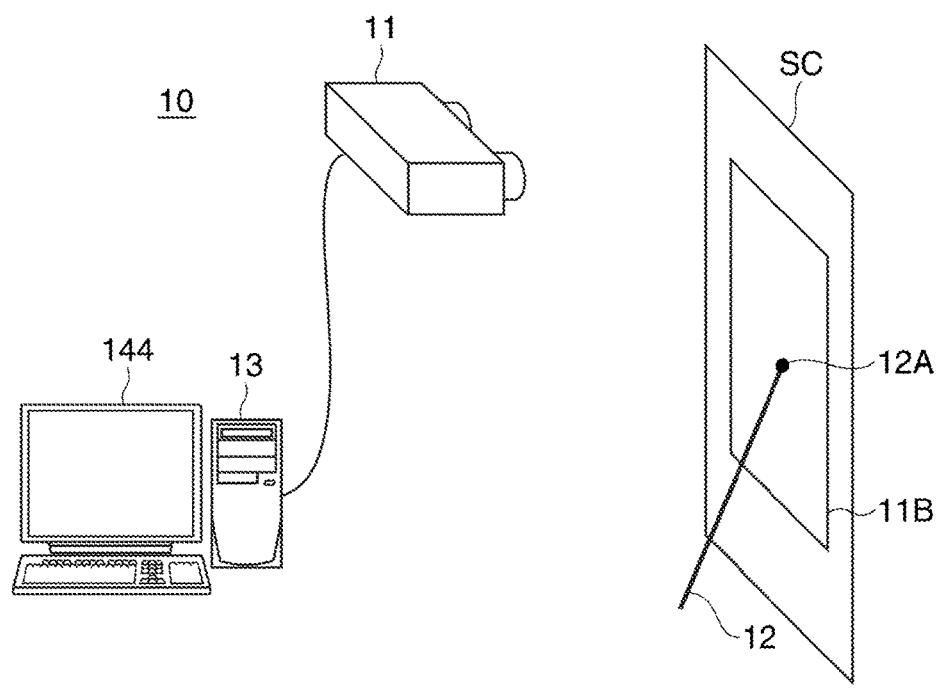
FIG. 1 shows a configuration of a display system according to an embodiment of the invention.

FIG. 1 shows a configuration of a display system 10 using a projector 11 according to an embodiment.

The projector 11 as a display device is wired-connected to a PC (Personal Computer) 13 as an image supply device by an image signal cable or the like. Image data is input from the PC 13 to the projector 11, and the projector 11 projects a display image on a screen SC as a projection surface (display surface) based on the input image data. Further, the projector 11 is connected to the PC 13 by a communication cable or the like and transmits and receives control data etc. between the PC 13 and itself. The projector 11 may perform projection if the image data input from the PC 13 represents a still image or a moving image. The screen SC is not limited to a flat plate fixed to a wall surface, but the wall surface itself may be used as the screen SC. Here, a range in which images are projected on the projector 11 is referred to as an effective projection area 11B (displayable area).

In the display system 10, during image projection by the projector 11, a user may hold a pointing tool 12 in his or her hand and execute a location pointing operation in the effective projection area 11B of the screen SC. The pointing tool 12 is an operation device having a pen shape or a rod shape, and used for pointing an arbitrary location on the screen SC. The projector 11 has a function of detecting a tip end location of the pointing tool 12, as will be described later, and outputs control data indicating coordinates of the detected pointed location to the PC 13.

Figure 2:
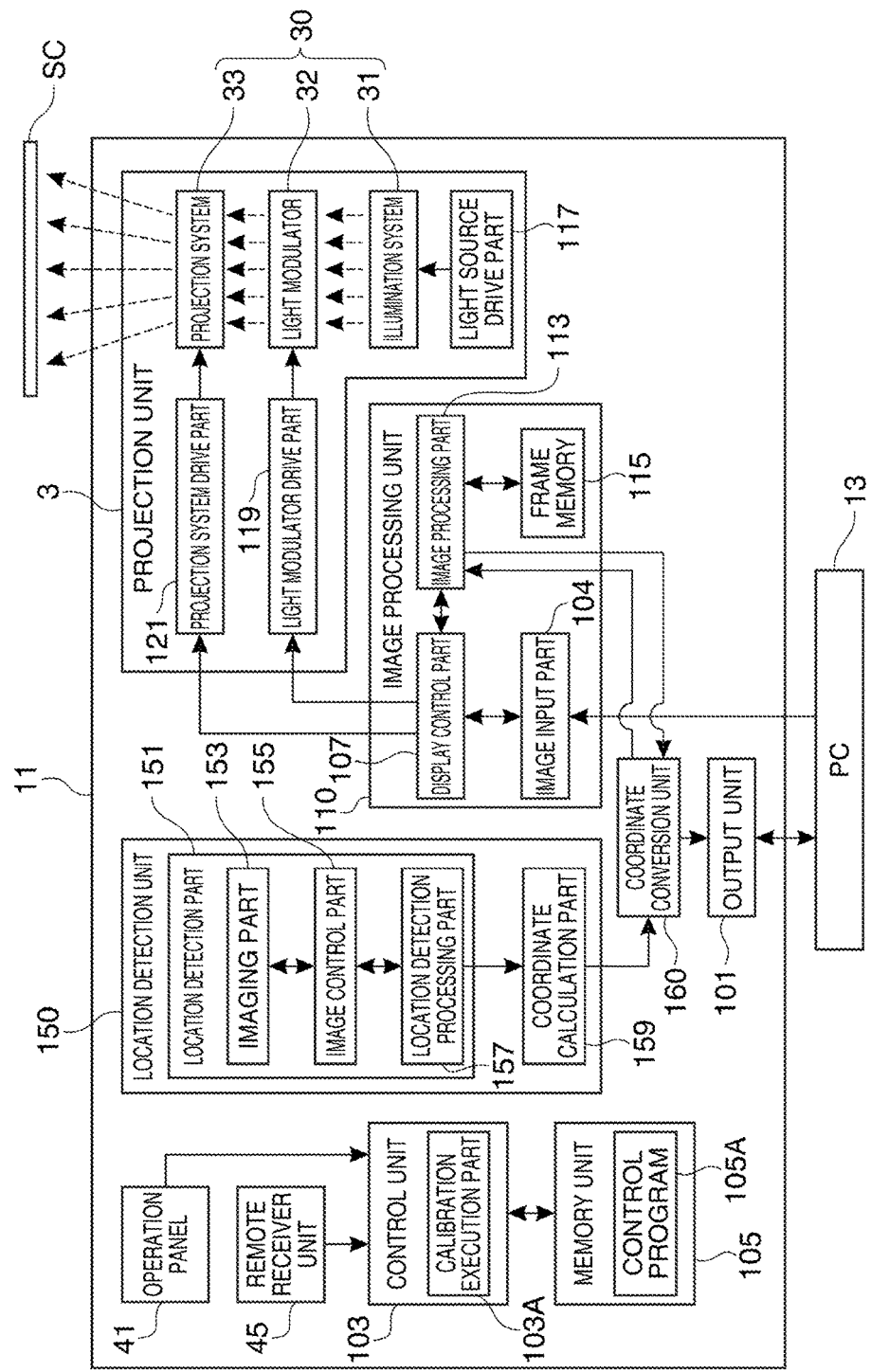
FIG. 2 is a block diagram showing a functional configuration of a projector.

FIG. 2 is a block diagram showing a functional configuration of the projector 11.

The projector 11 is roughly divided and includes an image processing unit 110 that executes image processing for display based on image data input from the PC 13, a projection unit 3 (display unit) that projects an image on the screen SC according to the control of the image processing unit 110, a location detection unit 150 that detects a pointed location of the pointing tool 12 on the screen SC, a coordinate conversion unit 160 that converts coordinates of the pointed location detected by the location detection unit 150 into coordinates in the image data, an output unit 101 (output unit) that outputs the converted coordinates converted by the coordinate conversion unit 160 to the PC 13, and a control unit 103 that controls the respective units.

The control unit 103 includes a CPU, a nonvolatile memory, a RAM, etc. (not shown), and reads out a control program 105A stored in a memory unit 105 connected to the control unit 103 and controls the respective units of the projector 11. Further, by executing the control program 105A stored in the memory unit 105, the control unit 103 functions as a calibration execution part 103A. The calibration execution part 103A executes calibration, which will be described later, and obtains a correspondence relationship (coordinate conversion parameter) between the coordinates in taken image data and the coordinates in the area on the screen SC to be calibrated. The memory unit 105 includes a magnetic, optical recording device or a semiconductor memory device, and stores data of various programs, various set values, etc. including the control program 105A.

An operation panel 41 and a remote receiver unit 45 are connected to the control unit 103.

The operation panel 41 includes various switches and indicator lamps and is provided on an exterior housing (not shown) of the projector 11. The control unit 103 appropriately lights or blinks the indicator lamps of the operation panel 41 in response to the operation condition and the set condition of the projector 11. When the switch of the operation panel 41 is operated, an operation signal in response to the operated switch is output to the control unit 103.

Further, the projector 11 receives an infrared signal transmitted from a remote (not shown) used by the user as an operator who operates the projector 11 in response to a button operation by the remote receiver unit 45. The remote receiver unit 45 receives the infrared signal received from the remote using a light receiving element, and outputs an operation signal in response to the signal to the control unit 103. The operation panel 41, the remote, etc. form an operation part for the user to input the operation for the projector 11. The operation signal indicating the operation for the projector 11 may be transmitted from the PC 13 to the projector 11 and the projector 11 may be controlled based on the operation signal. In this case, the PC 13 also functions as the operation part for the user to input the operation for the projector 11.

The control unit 103 detects the operation by the user based on the operation signal input from the operation panel 41 or the remote receiver unit 45, and controls the projector 11 according to the operation.

The projector 11 is roughly divided and includes an optical system that forms an optical image and an image processing system that electrically processes an image signal. The optical system is a projection unit 30 (projection unit) including an illumination system 31, a light modulator 32 (light modulation unit), and a projection system 33. The illumination system 31 includes a light source of a xenon lamp, ultrahigh pressure mercury lamp, an LED (Light Emitting Diode), or the like. Further, the illumination system 31 may include a reflector and an auxiliary reflector that guide light generated by the light source to the light modulator 32, and may include a group of lenses (not shown) for improving the optical property of the projection light, a polarizer, a photochromic element that reduces the amount of light generated by the light source in a path reaching the light modulator 32, or the like.

The light modulator 32 receives the signal from the image processing system, which will be described later, and modulates the light from the illumination system 31. In the embodiment, the case where the light modulator 32 is formed using a transmissive liquid crystal display panel will be explained as an example. In this configuration, the light modulator 32 includes three liquid crystal display panels corresponding to the three primary colors of RGB for color projection. The light from the illumination system 31 is separated into three color lights of RGB and the respective color lights enter the corresponding respective liquid crystal display panels. The color lights modulated through the respective liquid crystal display panels are combined by a combining system including a cross dichroic prism or the like and output to the projection system 33.

The projection system 33 includes a zoom lens that enlarges, reduces, and focuses the projected image, a zoom adjustment motor that adjusts the degree of zooming, a focus adjustment motor that performs adjustment of focus, etc.

The projection unit 3 includes a projection system drive part 121 that drives the respective motors of the projection system 33 according to the control of a display control part 107, a light modulator drive part 119 that drives the light modulator 32 for drawing based on the image signal output from the display control part 107, and a light source drive part 117 that drives the light source of the illumination system 31 according to the control of the control unit 103 in addition to the projection unit 30.

On the other hand, the image processing system includes an image processing unit 110 that processes image data according to the control of the control unit 103 that controls the entire projector 11 in an integrated manner. The image processing unit 110 includes an image input part 104 connected to the PC 13. The image input part 104 is an interface for inputting image data and, for example, general-purpose interfaces such as a DVI (Digital Visual Interface) interface, a USB interface, and a LAN interface to which digital video signals are input, an S-video terminal to which composite video signals such as NTSC, PAL, SECAM are input, an RCA terminal to which composite video signals are input, a D-terminal to which component video signals are input, an HDMI connector compliant to the HDMI (registered trademark) standard, etc. may be used. Further, the image input part 104 may have an A/D converter circuit that converts analog video signals into digital image signals and is connected to the PC 13 via an analog video terminal such as a VGA terminal. Note that the image input part 104 may transmit and receive image signals via wired communication or transmit and receive image signals via wireless communication.

Further, the image input part 104 may have a DisplayPort designed by VESA (Video Electronics Standards Association), and specifically have a DisplayPort connector or a Mini Displayport connector and an interface circuit compliant to the Displayport standard. In this case, the projector 11 may be connected to the DisplayPort of the PC 13 or a portable device having the same function as that of the PC 13.

Furthermore, the image processing unit 110 (image forming unit) includes the display control part 107 that processes the image data input via the image input part 104, and an image processing part 113 that develops an image in a frame memory 115 according to the control of the display control part 107 and generates an image to be projected by the projection unit 30.

The display control part 107 (a display control unit) performs discrimination of the format (frame rate, resolution, compression state) of the image data input via the image input part 104 or the like, determines necessary processing for displaying a display image on the light modulator 32, and executes the processing by controlling the image processing part 113. The image processing part 113 develops the image data input via the image input part 104 in the frame memory 115 according to the control of the display control part 107, appropriately executes various conversion processing such as interlace/progressive conversion and resolution conversion, generates an image signal in a predetermined format for displaying the display image drawn in the frame memory 115, and outputs the signal to the display control part 107. Note that the projector 1 may change the resolution and the aspect ratio of the input image data and display the data, or display the image data dot by dot with the resolution and the aspect ratio of the input image data maintained. Further, the image processing part 113 may execute various image processing such as keystone correction, color compensation in response to the color mode, and enlarging/reducing processing according to the control of the display control part 107. The display control part 107 outputs the image signal processed by the image processing part 113 to the light modulator drive part 119, and displays the signal on the light modulator 32. Further, the image processing part 113 derives image location information, which will be described later, from information of the resolution, the aspect ratio of the image data being displayed, the display size in the liquid crystal display panel of the light modulator 32, etc., and outputs the obtained image location information to the coordinate conversion unit 160.

The control unit 103 executes the control program 105A and controls the display control part 107 to execute the keystone correction of the display image formed on the screen SC. Further, the control unit 103 controls the display control part 107 to execute the enlarging/reducing processing of the display image based on the operation signal input from the operation panel 41 or the remote receiver unit 45.

The projector 11 has the location detection unit 150 that detects coordinates of the pointed location pointed by the pointing tool 12 on the screen SC. The location detection unit 150 includes a location detection part 151 (location detection unit) having an imaging part 153 that images the screen SC, an image control part 155 that controls the imaging part 153, and a location detection processing part 157 that detects the pointed location of the pointing tool 12 based on the taken image of the imaging part 153, and a coordinate calculation part 159 (coordinate calculation unit) that calculates the coordinates of the pointed location detected by the location detection part 151.

The imaging part 153 is a digital camera of taking an angle of view including the maximum range in which the projection unit 30 can project images on the screen SC (corresponding to a projectable area 11A, which will be described later), and executes imaging according to the control of the image control part 155 and outputs taken image data. The image control part 155 controls the imaging part 153 to execute imaging according to the control of the control unit 103. When the imaging part 153 has mechanisms of adjusting zoom factor, focus, aperture at imaging, the image control part 155 controls these mechanisms to execute imaging under preset conditions. After imaging, the image control part 155 acquires the taken image data output by the imaging part 153 and outputs the data to the location detection processing part 157. The taken image data output from the imaging part 153 may be expressed in the format of RGB, YUV, or the like, or may indicate only the brightness component. Further, the image control part 155 may output the taken image data output from the imaging part 153 to the location detection processing part 157 without change, or adjust resolution or convert the data into a predetermined file format (JPEG, BMP, or the like) and output the data to the location detection processing part 157.

Note that the imaging part 153 may have a configuration that can image visible light or a configuration that can image non-visible light (infrared light or the like). In the case where the imaging part 153 can image non-visible light, a configuration in which the pointing tool 12 outputs non-visible light and the imaging part 153 images the non-visible light output from the pointing tool 12 or a configuration in which the pointing tool 12 has a reflection part that can reflect non-visible light, non-visible light is projected from the projector 11 to the screen SC under the control of the control unit 103, and the non-visible light reflected by the reflection part of the pointing tool 12 is imaged by the imaging part 153, or the like may be employed. Further, a pattern for location detection may be provided on the surface of the pointing tool 12. In this case, by detecting the pattern for location detection from the taken image taken by the imaging part 153, the pointing tool 12 may be detected.

The location detection processing part 157 analyzes the taken image data input from the image control part 155, and extracts a boundary between the outside of the effective projection area 11B and the effective projection area 11B and the image of the pointing tool 12 from the taken image data and specifies the pointed location by the pointing tool 12. The pointed location of the pointing tool 12 is a location of the tip end of the rod-shaped or pen-shaped pointing tool 12, for example. The location detection part 151 obtains coordinates of the detected pointed location in the effective projection area 11B.

Further, the projector 11 includes the coordinate conversion unit 160 (coordinate conversion unit) that converts the coordinates output by the location detection unit 150 (first coordinates) into the coordinates in the image data input from the PC 13 (second coordinates).

The coordinates output by the location detection processing part 157 are coordinates detected based on the taken image data of the imaging part 153, and coordinates on coordinate axes virtually provided on the display image formed on the screen SC. The coordinate conversion unit 160 acquires various information including resolution of the image developed by the image processing part 113 in the frame memory 115 and information on processing of resolution conversion, zooming, or the like performed when the image processing part 113 developed the image, and converts the coordinates on the display image obtained by the location detection processing part 157 into coordinates in the input image data based on the acquired information. As described above, the light modulator 32 is formed using the liquid crystal display panel having a predetermined number of pixels arranged laterally and longitudinally in a matrix, for example, and, by placing the coordinate axes of the virtual orthogonal coordinate system in the arrangement directions of the pixels, the location on the panel may be expressed by the coordinates. On the other hand, the coordinates in the taken image data are affected by various elements such as the distance between the projector 11 and the screen SC, the zoom factor in the projection system 33, the installation angle of the projector 11, and the distance between an imaging device 5 and the screen SC, etc. Accordingly, in the projector 11 according to the embodiment of the invention, calibration, which will be described later, is first executed, and a correspondence relationship (coordinate conversion parameter) between the coordinates in the taken image data and the coordinates in the area on the screen SC to be calibrated is obtained. Here, the area on the screen SC to be calibrated may be the entire effective projection area 11B or a part of the effective projection area 11B. As the case where the part of the effective projection area 11B is calibrated, the case where, when the aspect ratio of the display image of the projector 11 and the aspect ratio of the screen SC are different (for example, the display resolution of the projector 11 is WXGA and the aspect ratio of the screen SC is 4:3), display is performed so that the width in the vertical direction of the display image of the projector 11 may be the same as the width in the vertical direction of the screen SC is considered. In this case, it is conceivable that, of the effective projection area 11B of the projector 11, the area contained in the screen SC is to be calibrated and the other areas are not to be calibrated. When the coordinate conversion parameter is obtained by the calibration execution part 103A, the coordinate calculation part 159 performs conversion of the coordinates based on the coordinate conversion parameter. The conversion processing will be described later. Further, the coordinate conversion unit 160 converts the coordinates output from the coordinate calculation part 159 (first coordinates) based on the image location information, which will be described later, and outputs the converted coordinates (second coordinates) to the output unit 101.

The output unit 101 is an interface connected to the PC 13 and outputting the coordinate data after conversion processing by the coordinate conversion unit 160 (coordinate information) to the PC 13, and, for example, includes a general-purpose interface such as a USB interface, a wired LAN interface, a wireless LAN interface, or IEEE 1394. Here, the image input part 104 and the output unit 101 will be explained as separate functional blocks, however, obviously, they may be physically integrated into one interface. For example, one USB interface may realize both functions of the output unit 101 and the image input part 104. Further, the output unit 101 may be connected to the image processing part 113 of the image processing unit 110 and may output the coordinates after the conversion processing of the coordinate conversion unit 160 to the image processing unit 110. The output destination of the output unit 101 is controlled by the control unit 103. The coordinate data output by the output unit 101 is output to the PC 13 as the same data as coordinate data output by a pointing device such as a mouse, a trackball, a digitizer, a pen tablet, or the like.

Further, in the PC 13, in the case where the coordinate data output from the output unit 101 is treated equally to the coordinate data output by the general-purpose pointing devices, general-purpose device driver programs corresponding to these general-purpose pointing devices may be used. Generally, these general-purpose device driver programs are installed as part of the OS (operating system) of the PC 13 in advance, and thus, it is not necessary to install device driver programs when the general-purpose device driver programs are used. Further, it is not necessary to prepare specialized device driver programs because the general-purpose device driver programs are used. On the other hand, the information that can be exchanged between the projector 11 and the PC 13 is limited in the range defined by the specifications of the general-purpose device driver programs.

Alternatively, specialized device driver programs compliant to the projector 11 may be prepared and the device driver programs may be installed and used in the PC 13. In this case, the specialized device driver programs are necessary, but the information that can be exchanged between the projector 11 and the PC 13 may be arbitrarily set in response to the specifications of the specialized device driver programs.

Figure 3:
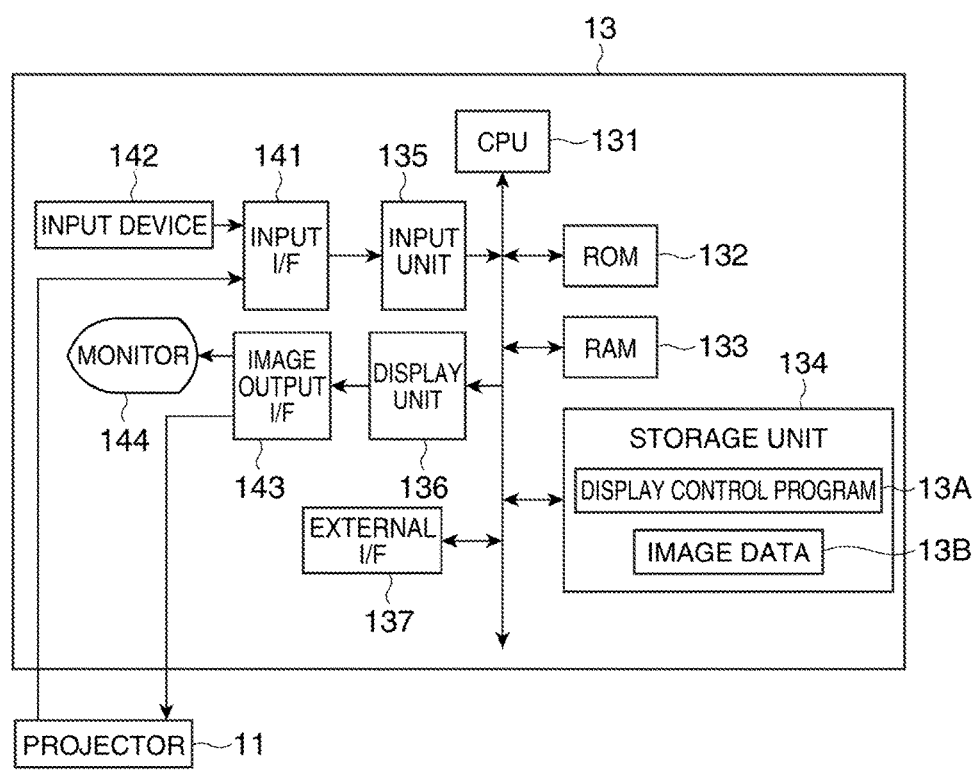
FIG. 3 is a block diagram showing a functional configuration of a PC.

FIG. 3 is a block diagram showing a functional configuration of the PC 13.

As shown in FIG. 3, the PC 13 includes a CPU 131 that executes the control programs and centrally controls the respective parts of the PC 13, a ROM 132 that stores a basic control program to be executed by the CPU 131 and data on the program, a RAM 133 that temporarily stores the programs and the data executed by the CPU 131, a storage unit 134 that stores the programs and the data in a non-volatile manner, an input unit 135 that detects an input operation and outputs data and an operation signal indicating input contents to the CPU 131, a display unit 136 that outputs display data for displaying processing results by the CPU 131 etc., and an external I/F 137 that transmits and receives data etc. between an external device and itself, and these respective units are connected to one another via a bus.

The input unit 135 includes an input I/F 141 having a connector and a power supply circuit, and an input device 142 is connected to the input I/F 141. The input I/F 141 includes a general-purpose interface for input device such as an USB interface, for example, and the input device 142 is a keyboard or a pointing device such as a mouse or a digitizer.

A communication cable in connection to the projector 11 is connected to the input I/F 141, and the coordinates of the pointed location by the pointing tool 12 are input from the projector 11. Here, to the input I/F 141, the coordinate data output by the output unit 101 of the projector 11 is input as the same data as the coordinate data output by the pointing device such as a mouse, a trackball, a digitizer, or a pen tablet. Therefore, the PC 13 may process the coordinate data input from the projector 11 as an input signal from the input device, and may perform an operation of moving the mouse cursor and the pointer based on the coordinate data, for example.

The display unit 136 includes an image output I/F 143 having a connector for image signal output or the like, and image signal cables (not shown) in connection to a monitor 144 and the projector 11 are connected to the image output I/F 143. The image output I/F 143 has pluralities of VGA terminals to which analog video signals are input, DVI interfaces to which digital video signals are input, USB interfaces, LAN interfaces, S-video terminals to which composite video signals of NTSC, PAL, SECAM, etc. are input, RCA terminals to which composite video signals are input, D-terminals to which component video signals are input, HDMI connectors compliant to the HDMI (registered trademark) standard, etc., for example, and the monitor 144 and the projector 11 are respectively connected to the connectors. Further, the image output I/F 143 may have a DisplayPort designed by VESA, and specifically have a DisplayPort connector or a Mini Displayport connector and an interface circuit compliant to the Displayport standard. In this case, the PC 13 may output digital video signals to the projector 11, the monitor 144, or another device via the Displayport. Note that the image output I/F 143 may transmit and receive image signals via wired communication or transmit and receive image signals via wireless communication.

The storage unit 134 stores a display control program 13A to be executed by the CPU 131, and image data 13B to be output at execution of the display control program 13A. The CPU 131 executes the display control program 13A, and then, executes processing of transmitting the image data 13B to the projector 11. In this processing, the CPU 131 reproduces the image data 13B, and generates an image signal with predetermined display resolution using the display unit 136 and outputs the signal to the image output I/F 143. Here, the display unit 136 outputs an analog image signal to the connector to which an analog signal is output and outputs digital image data to the connector to which digital image data is output.

Further, when the coordinates in response to the operation of the pointing device are input from the input unit 135 during the execution of the display control program 13A, the CPU 131 generates an image for displaying a pointer 12A (FIG. 1) in a location corresponding to the coordinates. Then, the CPU 131 generates image data with the pointer 12A superimposed on the image data 13B being reproduced, and outputs the image data from the input I/F 141 to the projector 11.

As described above, in the display system 10, the function of the PC 13 drawing the image data with the pointer 12A superimposed thereon to be output to the projector 11 is executed by the PC 13.

Figure 4A:
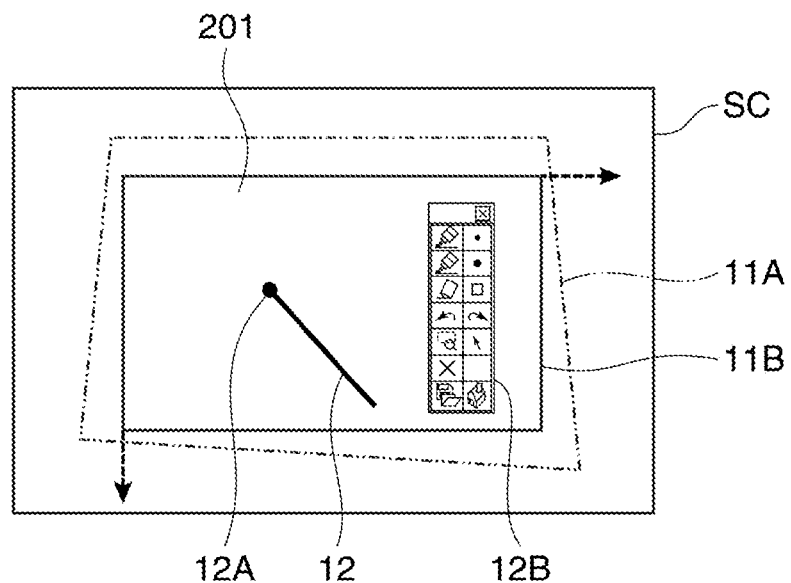
FIGS. 4A and 4B show examples of projection of images on a screen.
Figure 4B:
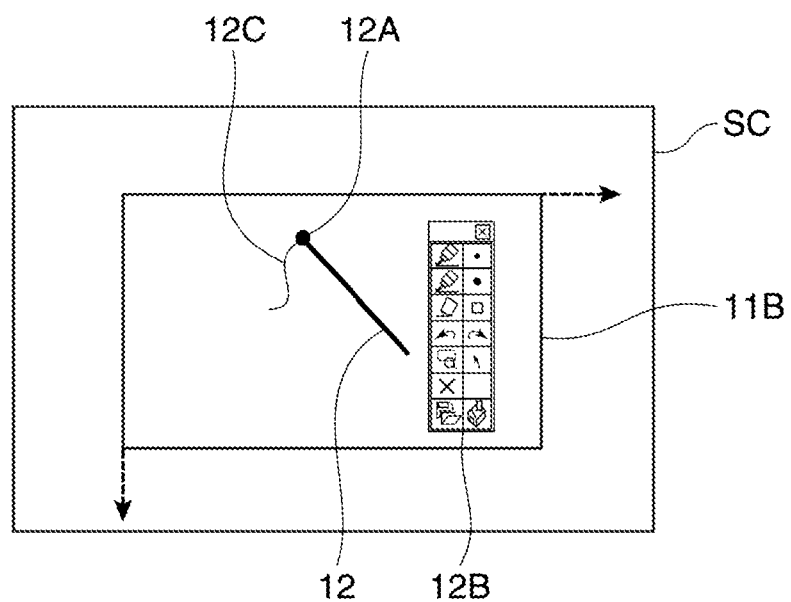

FIGS. 4A and 4B show examples of projection of images on the screen SC, and FIG. 4A shows a state in which the pointer 12A is projected according to the pointed location of the pointing tool 12 and FIG. 4B shows a state in which a drawn FIG. 12C is drawn according to the pointed location.

When a display image is projected using the entire liquid crystal display panels of the light modulator 32, an image is formed in the projectable area 11A shown by a dashed-two dotted line in FIG. 4A. Trapezoidal distortion is produced as shown in FIG. 4A except the case where the projector 11 is positioned right in front of the screen SC, and the projector 11 performs keystone correction using the function of the display control part 107. After the execution of the keystone correction, a display image is projected in the effective projection area 11B. Typically, the effective projection area 11B is set to form a rectangular shape with the maximum size on the screen SC. Specifically, the size is determined by the resolution of the liquid crystal display panels of the light modulator 32 and the degree of the trapezoidal distortion and not necessarily the maximum size.

The calibration execution part 103A of the projector 11 executes calibration in the effective projection area 11B after the keystone correction. In the calibration, the calibration execution part 103A controls the image processing part 113 to draw a predetermined image for calibration. In the state in which the image for calibration is projected on the screen SC, the location detection unit 150 images the screen SC under the control of the calibration execution part 103A. The image for calibration is an image in which dots are arranged on a white background, for example, and stored in the memory unit 105 or the like in advance. Note that the image for calibration is not necessarily stored in the memory unit 105 or the like, but the calibration execution part 103A may generate an image for calibration at each time when execution of calibration is necessary and the calibration is executed.

The calibration execution part 103A detects a contour of the display image in the taken image data, i.e., a boundary between the outside of the effective projection area 11B and the effective projection area 11B and dots in the taken image data, and specifies a correspondence relationship among an imaging range (angle of view) of the location detection unit 150, i.e., a location in the taken image data, a location on the effective projection area 11B, and a location on the image drawn by the image processing part 113. The calibration execution part 103A obtains a coordinate conversion parameter used by the coordinate calculation part 159 as will be described later based on the correspondence relationship between the location on the taken image specified by the calibration and the location on the effective projection area 11B. The coordinate conversion parameter includes data associating coordinates on the image drawn by the image processing part 113 with coordinates obtained on the taken image data. The coordinate calculation part 159 may convert the coordinates obtained on the taken image data into the coordinates on the image drawn by the image processing part 113 based on the coordinate conversion parameter. The coordinate calculation processing is performed based on the coordinate conversion parameter.

The calibration is performed by execution of a program for calibration (not shown) stored in the memory unit 105 by the control unit 103, and thus, it is not necessary to install and execute the program for calibration in the PC 13. Further, the calibration may be processing automatically performed by the calibration execution part 103A based on the taken image data or processing requiring use's operation for the image for calibration. Furthermore, the projector 11 may use the two kinds of processing in combination. As a conceivable operation for the image for calibration by the user, there is an operation of pointing a dot contained in the image for calibration by the user using the pointing tool 12 or the like.

The location detection unit 150 of the projector 11 executes imaging in the state in which the image is projected in the effective projection area 11B, virtually sets orthogonal coordinates with their origin at a corner of the effective projection area 11B in the taken image as shown by dashed arrows in the drawings, and obtains coordinates of the tip end location of the pointing tool 12 in the coordinate system. The orthogonal coordinates are set based on the coordinate conversion parameter obtained by the calibration. Subsequently, when the coordinates of the tip end of the pointing tool 12 in the image data displayed in the effective projection area 11B are obtained by the coordinate conversion unit 160, the pointer 12A and a menu bar 12B shown in FIG. 4A, for example, are displayed according to the coordinates. The pointer 12A is drawn as a sign indicating the tip end location of the pointing tool 12. Further, the menu bar 12B is a GUI that can be operated by the pointing tool 12, and drawing of a figure such as a line, saving, erasing, and copying of data of the drawn figure, or the like may be performed by pointing a button located on the menu bar 12B using the pointing tool 12. As a specific example, by moving the pointing tool 12 from the location shown in FIG. 4A to the location in FIG. 4B, a drawn FIG. 12C is drawn along a trace of the tip end of the pointing tool 12. The drawn FIG. 12C is drawn by the PC 13 according to the coordinate data indicating the pointed location of the pointing tool 12 like the pointer 12A and the menu bar 12B, for example.

Further, on the menu bar 12B, a button for control of slide show display of sequentially displaying plural images that can be externally supplied (for example, image data stored by an external storage device such as a USB flash memory connected to the USB interface of the external I/F 102 or the like), a button for settings on the function itself of the projector 11 (changes of the aspect ratio, changes of the color mode, etc.) or the like can be placed. When the pointed location of the pointing tool 12 is output from the coordinate conversion unit 160, the control unit 103 acquires its coordinates, specifies the button pointed in the menu bar 12B, and executes an operation in response to the pointing operation.

Figure 5A:
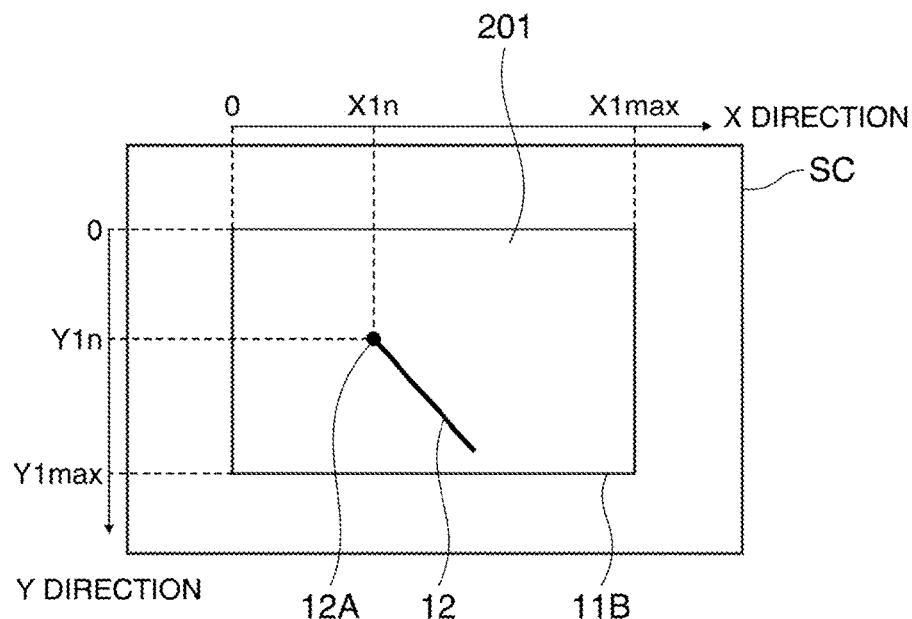
FIGS. 5A and 5B are explanatory diagrams showing processing of detecting and converting coordinates.
Figure 5B:
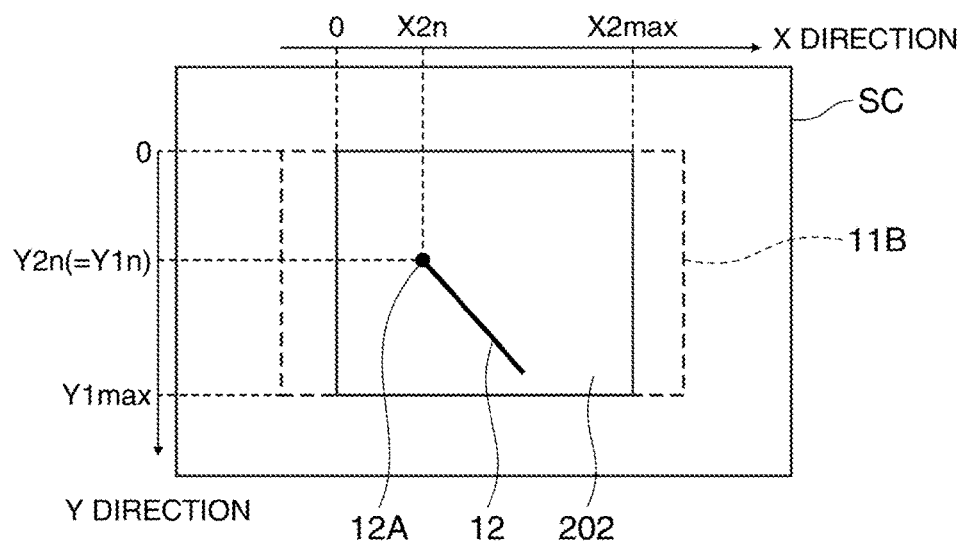
Figure 6A:
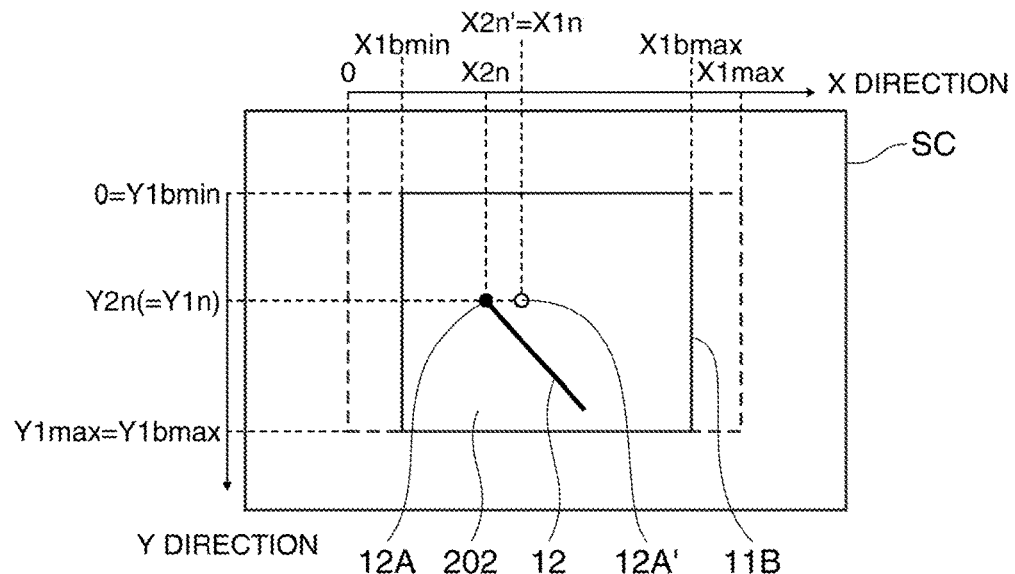
FIGS. 6A and 6B are explanatory diagrams showing the processing of detecting and converting the coordinates.
Figure 6B:
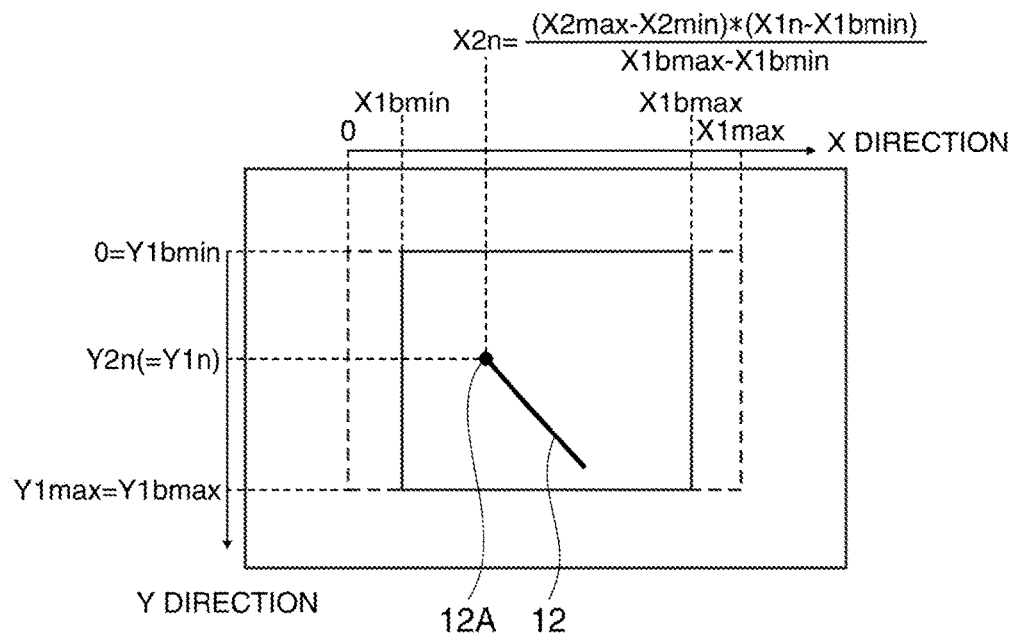

FIGS. 5A and 5B and FIGS. 6A and 6B are explanatory diagrams showing processing of detecting coordinates of a pointed location and converting them into coordinates in image data by the projector 11. FIG. 5A shows an initial state of the series of operation, FIG. 5B and FIGS. 6A and 6B show states in which resolution of the display image has been changed from the state in FIG. 5A.

In the example shown in FIG. 5A, the resolution of the effective projection area 11B is 1280×800 dots and the resolution of the image data input from the PC 13 is also 1280×800 dots based on the resolution of the liquid crystal display panels of the light modulator 32. Therefore, in the effective projection area 11B, a display image 201 of 1280× 800 dots is displayed. The location detection unit 150 sets an X-Y orthogonal coordinate system with the origin at the upper left corner of the effective projection area 11B, the rightward direction in the X-axis direction, and the downward direction in the Y-axis direction, and sets the end location in the X direction of the display image 201 to X1max, the end location in the Y direction to Y1max, and coordinates of the pointed location of the pointing tool 12 to (X1$n$, Y1$n$).

When the image data input from the PC 13 is switched to a display image 202 with resolution of 1024×768 dots, the display image 202 of 1066×800 dots is projected on the screen SC as shown in FIG. 5B. The display image 202 has the lower resolution than that of the display image 201, and thus, the area in which the display image 202 is projected is smaller than the effective projection area 11B.

Here, as shown in FIGS. 5A and 5B, when the pointing tool 12 on the screen SC is not moved, the pointed location itself is not moved, but the relative position between the pointed location and the displayed image changes. Accordingly, when the location detection unit 150 displays the pointer 12A according to the coordinates (X1$n$, Y1$n$) of the pointed location in the effective projection area 11B calculated based on the taken image data of the imaging part 153, the pointer 12A shifts from the actual pointed location.

That is, as shown in FIG. 6A, when the pointer is displayed at the coordinates (X1$n$, Y1$n$) in the coordinate system with the origin at the upper left corner of the changed display image 202, a pointer 12A' apart from the tip end of the pointing tool 12 is displayed. In this manner, the coordinates obtained with reference to the effective projection area 11B are affected by the resolution of the display image, and it may be impossible for the PC 13 to use the coordinates calculated by the location detection unit 150 for the display of the pointer 12A.

Accordingly, in order to deal with the case where the resolution of the display image changes, the projector 11 performs processing of converting coordinates (X1$n$, Y1$n$) of the pointed location calculated by the coordinate calculation part 159 of the location detection unit 150 into coordinates (X2$n$, Y2$n$) of the pointed location in the display image being displayed using the coordinate conversion unit 160.

As below, specific processing will be explained.

In the embodiment, the coordinate conversion unit 160 expresses the coordinates in the display image in a coordinate system (FIG. 5A) with the origin set at the corner of the effective projection area 11B. As shown in FIGS. 5B, 6A, and 6B, in the case where the display image (here, the display image 202) is displayed in an area smaller than the effective projection area 11B, the location detection processing part 157 detects the pointed location with the origin at the corner of the display image in the taken image of the imaging part 153, and the coordinate calculation part 159 specifies the location of the display image 202 in the effective projection area 11B and calculates the coordinates (X1$n$, Y1$n$) in the effective projection area 11B.

The coordinate conversion unit 160 acquires image location information from the image processing part 113 and obtains coordinates (X1$b$min, Y1$b$min) of the upper left corner corresponding to the origin of the display image 202 after change. The coordinates (X1$b$min, Y1$b$min) are coordinates with the origin at the upper left corner of the effective projection area 11B.

Further, in the following computation, values of X2max, X2min are used. The X2max is the maximum value in the X-axis direction in the coordinate system with the origin at the upper left corner of the display image 202 when the display image 202 is displayed, and the X2min is the minimum value in the same coordinate system. That is, it is considered that the X2max is the coordinate at the right end of the display image 202 on the X-axis and the X2min is the origin, zero, however, normalized values are used as the values of X2max, X2min and not limited to X2min=0. Accordingly, computation is performed with the value as a variable X2min.

As shown in FIG. 6B, it is assumed that the coordinates of the upper left corner corresponding to the origin of the display image 202 are (X1$b$min, Y1$b$min), the coordinate value of the end in the X-axis direction of the effective projection area 11B is X1max, the end in the X-axis direction of the display image 202 is X1$b$max, the coordinate value of the end in the Y-axis direction of the effective projection area 11B is Y1max, and the end in the Y-axis direction of the display image 202 is Y1$b$max.

In this case, coordinates (X2$n$, Y2$n$) are calculated by the following equations (1), (2).

$$X2n=(X2\text{max}-X2\text{min})\times(X1n-X1b\text{min})\div(X1b\text{max}-X1b\text{min}) \quad (1)$$

$$Y2n=(Y2\text{max}-Y2\text{min})\times(Y1n-Y1b\text{min})\div(Y1b\text{max}-Y1b\text{min}) \quad (2)$$

In the embodiment, as shown in FIG. 6B, Y1$b$min=Y2min=0 and Y1$b$max=Y2max=Y1max. Accordingly, from the equation, Y2$n$=Y1$n$.

Actually, the coordinates of the pointed location are obtained as normalized logical coordinates. As an example, X1min=0, X1max=32767, Y1min=0, and Y1max=32767.

Further, in the following example, the effective projection area 11B is set according to the image with resolution of 1280×800 dots and, when the coordinates in the effective projection area 11B are expressed by (XPn, YPn), it is assumed that (XPmin≤XPn≤XPmax, YPmin≤YPn≤YPmax) holds and XPmin=0, XPmax=1280, YPmin=0, and YPmax=800.

Furthermore, as information on the location and the size of the display image displayed in the effective projection area 11B, it is assumed that coordinates at the upper right end of the display image is (XP0, YP0) and (XP0, YP0)=(0, 0) in this example, and the size in the X-axis direction of the display image is WP0=1280 and the size in the Y-axis direction of the display image is HP0=800.

The coordinates (X1bmin, Y1bmin) of the upper left corner and the coordinates of the end location (X1bmax, Y1bmax) of the display image in the effective projection area 11B are obtained by the following equations (3) to (6).

$$X1bmin = (X1max - X1min) \times XP0 \div (XPmax - XPmin) \quad (3)$$

$$X1bmax = (X1max - X1min) \times (XP0 + WP0) \div (XPmax - XPmin) \quad (4)$$

$$Y1bmin = (Y1max - Y1min) \times YP0 \div (YPmax - YPmin) \quad (5)$$

$$Y1bmax = (Y1max - Y1min) \times (YP0 + HP0) \div (YPmax - YPmin) \quad (6)$$

The computations of the above equations (1) and (2) are performed based on the values obtained by the equations (3) to (6), and the coordinate conversion unit 160 obtains the coordinates of the pointed location in the display image. The coordinates may be used as information for specifying the location in the image data when the PC 13 draws the pointer 12A, the menu bar 12B, or the drawn FIG. 12C in the image data to be processed. Accordingly, the pointer 12A, the menu bar 12B, and the drawn FIG. 12C may be correctly drawn according to the pointed location by the pointing tool 12 without being affected by the resolution, the zooming factor, or the like of the display image.

However, the location and the size of the display image displayed in the effective projection area 11B are affected by the resolution and the display location of the display image. For example, when the projector 11 executes processing of changing the projection state such as changing of the display resolution, changing of the aspect ratio, zooming, changing (moving) of the display location of the image, or multi-window display processing in response to the operation using the operation panel 41 or the remote receiver unit 45 or the control signal transmitted from the PC 13, the image location information (XP0, YP0, WP0, HP0) also changes. Here, the image location information is information on arrangement of image arrangement areas (areas in which the display images 201, 202 are projected (displayed)) with respect to the effective projection area 11B. In other words, the image location information is information indicating location (arrangement) of the display images with respect to the effective projection area 11B (displayable area). Further, when the display resolution of the PC 13 changes and the resolution of the image data output to the projector 11 by the PC 13 (for example, when the setting on the resolution is changed in the PC 13), the image location information also changes. Note that "multi-window display processing" refers to processing of dividing the effective projection area 11B of the projector 11 into plural areas and displaying different images input from plural image supply devices in these areas.

FIGS. 7A to 7C and FIGS. 8A to 8D are explanatory diagrams showing changes of the projection state of an image and processing of converting coordinates, and showing examples in which the image location information (XP0, YP0, WP0, HP0) changes due to changes of the projection state.

Figure 7A:
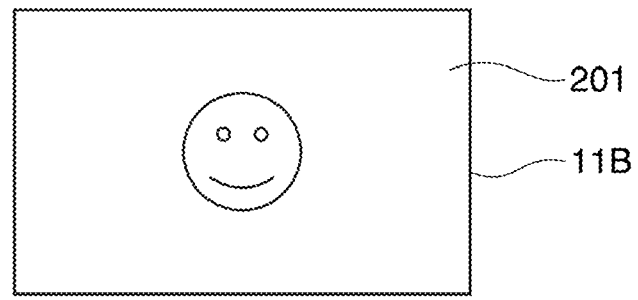
FIGS. 7A to 7C are explanatory diagrams showing changes of a projection state of an image and processing of converting coordinates.
Figure 7B:
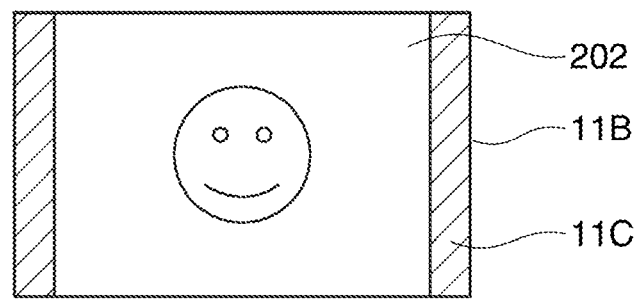

In FIG. 7A, the display image 201 with the same resolution (1280×800) as that of the effective projection area 11B is displayed. The image location information in this case is (XP0=0, YP0=0, WP0=1280, HP0=800). Here, when the display image is changed to the display image 202 with the different resolution (1066×800), as shown in FIG. 7B, non-display areas 11C are produced around the display image 202. In this case, the image location information is (XP0=107, YP0=0, WP0=1066, HP0=800).

Figure 7C:
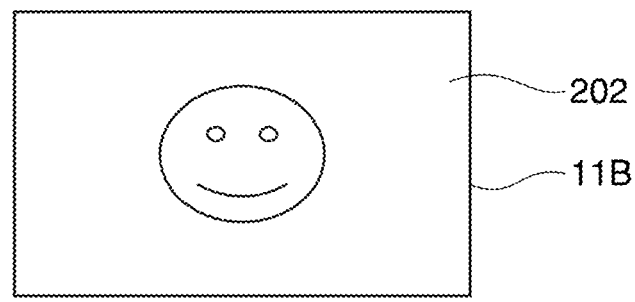

Here, when the aspect ratio of the display image 202 is changed for enlarged display in the entire effective projection area 11B, as shown in FIG. 7C, the display image 202 is displayed to fill the effective projection area 11B, and the image location information is (XP0=0, YP0=0, WP0=1280, HP0=800).

In the case where the non-display area 11C is produced and the pointed location of the pointing tool 12 is superimposed on the non-display area 11C, the coordinate conversion unit 160 may not output the coordinates of the pointed location or may output the coordinates of the location nearest the pointed location within the range of the display image to the PC 13.

Specifically, the coordinate conversion unit 160 determines whether or not the coordinates calculated by the coordinate calculation part 159 correspond to the non-display area 11C based on the image location information before coordinate conversion processing. Here, when the coordinates calculated by the coordinate calculation part 159 correspond to the non-display area 11C, the coordinate conversion unit 160 determines whether or not the coordinates in the X-axis direction and the coordinates in the Y-axis direction respectively correspond to the non-display area 11C (whether or not the coordinates are contained in the effective projection area 11B), and, when the coordinates correspond to the non-display area 11C, determines which of the larger coordinate side or the smaller coordinate side contains the coordinates in the non-display area 11C. For example, in FIG. 7B, when the pointed location is superimposed on the left non-display area 11C of the display image 202, the coordinates in the X-axis direction of the pointed location is contained in the non-display area 11C with the smaller values. When the coordinate conversion unit 160 has determined a deviation direction with respect to one of the coordinates in the X-axis direction and the coordinates in the Y-axis direction, the unit assigns the coordinates of the end location of the display image 202 in the deviation direction to the coordinates of the pointed location. When the pointed location is superimposed on the left non-display area 11C of the display image 202 in FIG. 7B, the value of the coordinate X1n in the X-axis direction of the pointed location is changed to the value of the X1bmin. Similarly, when the pointed location is superimposed on the right non-display area 11C of the display image 202, the value of the coordinate X1n in the X-axis direction of the pointed location is changed to the value of the X1bmax. The same may apply to the Y-axis direction.

That is, when the coordinates (X1n, Y1n) calculated by the coordinate calculation part 159 do not satisfy ($X1b\min \leq X1n \leq X1b\max$, $Y1b\min \leq Y1n \leq Y1b\max$), the coordinate conversion unit 160 outputs one of (X1*b*min, Y1*n*), (X1*b*max, Y1*n*), (X1*n*, Y1*b*min), (X1*n*, Y1*b*max). Thereby, with respect to the pointed location not contained in the display image, the coordinates may be output and the pointer 12A or the menu bar 12B may be drawn near the pointed location.

Figure 8A:
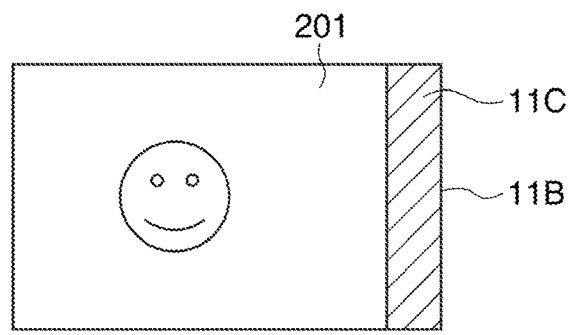
FIGS. 8A to 8D are explanatory diagrams showing changes of a projection state of an image and processing of converting coordinates.

Further, the display location of the display image 201 is shifted from the state shown in FIG. 7A to the left by the amount of 160 dots, as shown in FIG. 8A, the left side of the display image 201 is out of the screen and the non-display area 11C is produced on the right of the display image 201. In the state in FIG. 8A, the image location information is (XP0=−160, YP0=0, WP0=1280, HP0=800). Note that, in FIG. 8A, the case where the display location of the display image 201 is shifted to the left is exemplified, however, the display image 201 may be moved in another direction than the left (right, upward, or downward).

Figure 8B:
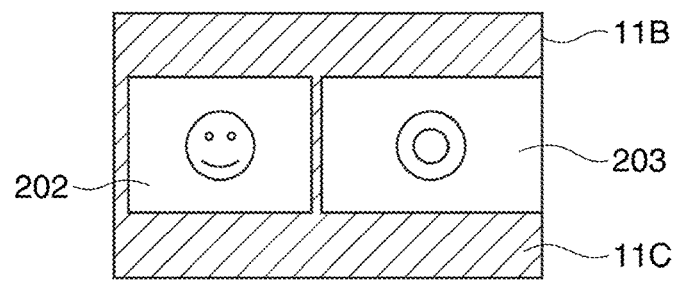

In addition, the projector 11 has the so-called multi-window display function of displaying plural display images side by side at the same time. FIG. 8B shows an example of displaying the display image 202 and a display image 203 by the multi-window display function. In this example, the display image 202 and the display image 203 are reduced with their aspect ratios kept so as to be displayed in the effective projection area 11B side by side, and the non-display area 11C is produced around them. In the case where the plural display images are displayed at the same time by the multi-window display function, the image location information may be defined on the respective display images. In the case as shown in FIG. 8B, different image location information may be defined on the respective display image 202 and display image 203. The resolution of the display image 201 after reduction becomes 533×400 in halves in the longitudinal and lateral directions, and the image location information on the display image 202 is (XP0=53, YP0=200, WP0=533, HP0=400).

The projector 11 can enlarge or reduce one of the respective display image 202 and the display image 203 at execution of the multi-window display function. In this case, when the user performs operation of commanding enlargement or reduction of one of the display images 202, 203 with the pointing tool 12, the projector 11 enlarges or reduces the pointed display image in response to the operation, and updates the image location information of the enlarged or reduced display image.

Figure 8C:
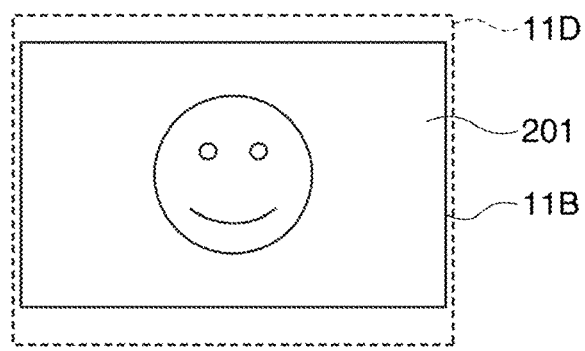
Figure 8D:
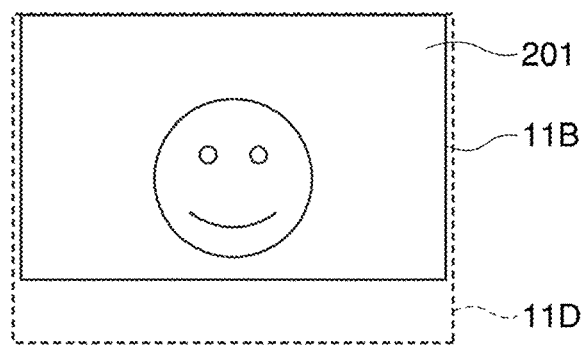

The projector 11 has a zoom function of enlarging an image to larger than the effective projection area 11B and displaying a part thereof. FIG. 8C shows an example in which the display image 202 shown in FIG. 7B is enlarged with resolution 1.25 times the original resolution. In the example in FIG. 8C, a virtual display area 11D larger than the effective projection area 11B is necessary for display of the entire display image 202, and actually, only the part within the effective projection area 11B at the center of the display image 202 is displayed. The image location information is determined with reference to the coordinates of the corner of the virtual display area 11D and the resolution of the virtual display area 11D to be (XP0=−27, YP0=−100, WP0=1333, HP0=1000). Further, the display location in the display image enlarged by the zoom function may be shifted. FIG. 8D shows a state in which the enlarged display image 202 shown in FIG. 8C is shifted downward by an amount of 100 dots. The processing corresponds to processing of moving the virtual display area 11D downward relative to the effective projection area 11B, and the image location information is (XP0=−27, YP0=0, WP0=1333, HP0=1000).

Note that, in FIG. 8A, the case where the display location of the display image 201 is shifted downward is exemplified, however, the display image 201 may be moved in another direction than the downward (upward, right, or left).

The coordinate conversion unit 160 acquires information from the control unit 103 and the display control part 107, updates the image location information, and converts the coordinates based on the updated image location information at each time when the projection state (display state) of the display image by the projection unit 30 changes. For example, the image location information is updated at the following times when the control unit 103 detects input of image data from the PC 13 when the control unit 103 detects a change in information on image data input from the PC 13 (resolution of an image or the like)

when the resolution of image data is changed in the projector 1 when the aspect ratio of image data is changed when a digital zoom function of enlarging/reducing an image drawn by the light modulator 32 by image processing of image data to be projected is executed or terminated when the display location of a display image with respect to the effective projection area 11B is changed when an image is enlarged by the digital zoom function, and a function of changing the display location of the image by image processing is executed or terminated when a tele/wide function of enlarging/reducing the projection size of the whole including the images drawn by the light modulator 32 and the background, i.e., the entire effective projection area 11B by performing image processing of image data is executed or terminated when an image is reduced by the digital zoom function, and a picture shift function of changing the display location of the image by image processing is executed or terminated when simultaneous display of plural images is executed or terminated when an output destination to which coordinates are output from the coordinate conversion unit 160 is changed from the image processing unit 110 to the PC 13 (output unit 101) or vise versa All of changing of the resolution, changing of the aspect ratio, and execution and termination of the various functions are executed by the image processing unit 110 under the control of the control unit 103. Note that the listed times are just examples and, obviously, image location information can be updated at other times.

Figure 9:
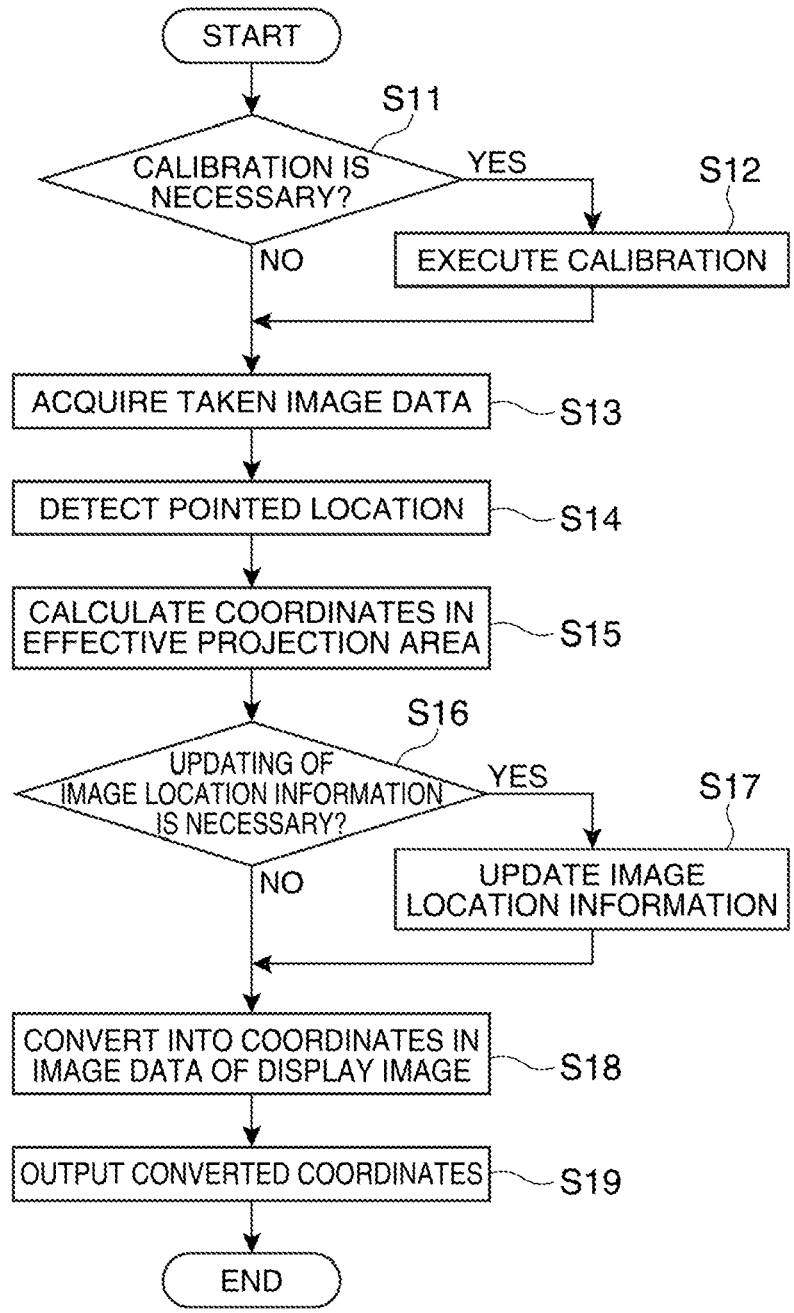
FIG. 9 is a flowchart showing an operation of the projector.

FIG. 9 is a flowchart showing an operation of the projector 11, and specifically shows an operation of detecting a pointed location by the pointing tool 12 and outputting coordinates of the pointed location.

The operation shown in FIG. 9 is repeatedly executed at regular time intervals after the projector 11 is activated or when display of the pointer 12A and the menu bar 12B is commanded by an operation of the operation panel 41 or the remote receiver unit 45.

First, whether or not calibration is necessary is determined (step S11). The determination may be performed according to the user's command indicating whether or not calibration is necessary. Or, whether or not calibration is necessary may be automatically determined by the calibration execution part 103A and the calibration may be automatically performed based on the determination result. If calibration is necessary (step S11; Yes), the calibration is executed as has been explained with reference to FIG. 4A (step S12). That is, an image for calibration is drawn by the image processing part 113, imaging is executed by the location detection unit 150 with the image for calibration projected, the contour of the effective projection area 11B in the obtained taken image data and feature points (dots or the like) contained in the image for calibration are detected, and thereby, the correspondence relationship between the image drawn by the image processing part 113 and the taken image data is obtained. Note that it is necessary to perform the calibration only once after the start of use of the projector 11, and not necessary to perform it again unless a specific event occurs. For example, in the cases of the following (1) to (3), it is necessary to perform new calibration.

(1) where keystone correction has been performed (2) where an install condition of the projector 11 is changed, for example, where the relative position (including the direction) of the projector 11 with respect to the screen SC has been changed (3) where an optical condition has been changed, for example, where the focus or zoom condition of the projection system 33 has been changed and where the optical axis of the projection system 33 or the imaging part 153 has been varied due to change with time or the like If these events occur, the correspondence relationship between the location on the taken image data in the initial state and the location on the image drawn by the image processing part 113 as reference for calculation of coordinates by the coordinate conversion unit 160 changes, and it is necessary to newly perform calibration. If these events do not occur, it is not necessary to perform calibration again. If the events have not occurred after the previous use of the projector 11 before the use at this time, the coordinate conversion parameter obtained in the previous calibration may be reused without new calibration. Methods for the calibration execution part 103A to determine whether or not calibration is necessary include, for example, a method of determining it based on whether or not there is an operation of the switch for commanding execution of keystone correction in the operation panel 41, and a method of providing a sensor of detecting a tilt or motion in the projector 11 and determining it based on a change in detection value of the sensor. Or, when adjustment of focus or zoom in the projection system 33 is performed, the calibration execution part 103A may automatically execute the calibration. Or, for the user to know a change in installation location and optical condition of the projector 11 and perform the operation of commanding calibration execution, a corresponding switch may be provided on the operation panel 41 or the operation part of the remote or the like.

When the image control part 155 allows the imaging part 153 to image the range containing the effective projection area 11B under the control of the control unit 103, the location detection processing part 157 acquires the taken image data (step S13) and detects the pointed location of the pointing tool 12 based on the taken image data (step S14). Subsequently, the coordinate calculation part 159 calculates the coordinates of the pointed location detected by the location detection processing part 157 (step S15). The coordinates calculated at step S15 are coordinates in the effective projection area 11B and the coordinates (X1$n$, Y1$n$) explained in FIG. 5A.

The coordinate conversion unit 160 determines whether or not updating of the image location information is necessary (step S16) and, if updating is necessary, acquires information from the control unit 103 and the display control part 107 and updates the image location information (step S17). The processing at step S17 may be executed not limited at the time after step S15, but at the above exemplified times as the need arises.

Then, the coordinate conversion unit 160 performs processing of converting the coordinates calculated by the coordinate calculation part 159 into coordinates in the image data of the display image (step S18). The coordinates after conversion are the coordinates (X2$n$, Y2$n$) explained in FIG. 5B.

The coordinate conversion unit 160 outputs the converted coordinates to the PC 13 (step S19), and the process is ended.

As described above, in the display system 10 according to the embodiment to which the invention is applied, the projector 11 includes the projection unit 3 that displays the display image on the screen SC based on the image data, the location detection part 151 that detects the pointed location with respect to the display image on the screen SC, the coordinate calculation part 159 that calculates the first coordinates as the coordinates of the pointed location in the displayable area within the screen SC (for example, the effective projection area 11B), the coordinate conversion unit 160 that converts the first coordinates calculated by the coordinate calculation part 159 into the second coordinates as the coordinates in the image data, and the output unit 101 that outputs the second coordinates obtained by the coordinate conversion unit 160, and outputs the coordinates of the pointed location by the pointing tool 12 as the coordinates in the image data. Thus, in the PC 13 using the output coordinates or the like, the relative position between the pointed location and the image data may be specified without being affected by the display mode of display resolution, the largeness of the display area, or the like. In the process of obtaining the coordinates of the pointed location in the image data, it is not necessary to directly associate the image data itself with the pointed location, and it is not necessary to perform calibration even when the size of the image data or the like is changed. Therefore, the execution frequency of the calibration may be reduced. Thereby, the convenience of the projector 11 may be improved. Further, it is not necessary to execute the program for calibration at the PC 13 side, and the burden on the user who is not familiar to the operation of the PC 13 may be lightened.

Further, the coordinate conversion unit 160 converts the first coordinates calculated by the coordinate calculation part 159 into the second coordinates based on the image location information as the information indicating the location of the display image with respect to the displayable area, and thus, even when the image location information as the information indicating the location of the display image with respect to the displayable area changes, the coordinates of the pointed location by the pointing tool 12 may be correctly converted and output.

Furthermore, the coordinate conversion unit 160 converts the first coordinates calculated by the coordinate calculation part 159 into the second coordinates based on the resolution of the image data. For example, the coordinate conversion unit 160 performs coordinate conversion using the image location information reflecting the display resolution of the projection unit 30 and the resolution of the image data. Thereby, even when the resolution of the image data changes, the coordinates of the pointed location may be correctly converted and output.

In addition, the location detection part 151 detects the location of the pointing tool 12 on the screen SC based on the taken image taken by the imaging part 153, thereby, detects the pointed location in the effective projection area 11B, and may promptly detect the pointed location.

Further, when the coordinates of the pointed location calculated by the coordinate calculation part 159 are out of the area in which the image data is displayed, in other words, when the pointed location is out of the display image, the coordinate conversion unit 160 uses the coordinates of the location near the pointed location within the area in which the display image is displayed as the converted coordinates, and thus, even when the location in the area with no image is pointed, may output the coordinates of the pointed location. The output coordinates are the coordinates of the location near the pointed location, and may be processed by the PC 13 or the like in the same manner as that for the coordinates of the pointed location.

Furthermore, when the coordinates of the pointed location calculated by the coordinate calculation part 159 are out of the area in which the image data is displayed, in other words, when the pointed location is out of the display image, the coordinate conversion unit 160 may not output the converted coordinates. In this case, the PC 13 may perform the operation corresponding only to the pointing in the location overlapping with the image.

In addition, in the case where the display mode of the image in the screen SC is changed by execution of the processing on the image data by the display control part 107 or the like, the coordinate conversion unit 160 performs processing of converting the coordinates based on the image location information that has been changed in response to the display mode. The newly converted coordinates here are output by the output unit 101. Thereby, proper coordinates may be constantly output with the change in display mode of the display image.

Note that the above described embodiment is just an example of the specific embodiment to which the invention is applied, but does not limit the invention, and the invention may be applied as an embodiment different from the above described embodiment. For example, in the embodiment, the configuration in which the converted coordinates are output to the PC 13 and the PC 13 draws the pointer 12A, the menu bar 12B, etc. has been explained as an example, however, the invention is not limited to that. An image processing unit 120 that generates images to be drawn and superimposed on the image data such as the pointer 12A, the menu bar 12B, etc. may be provided within the projector 11.

Figure 10:
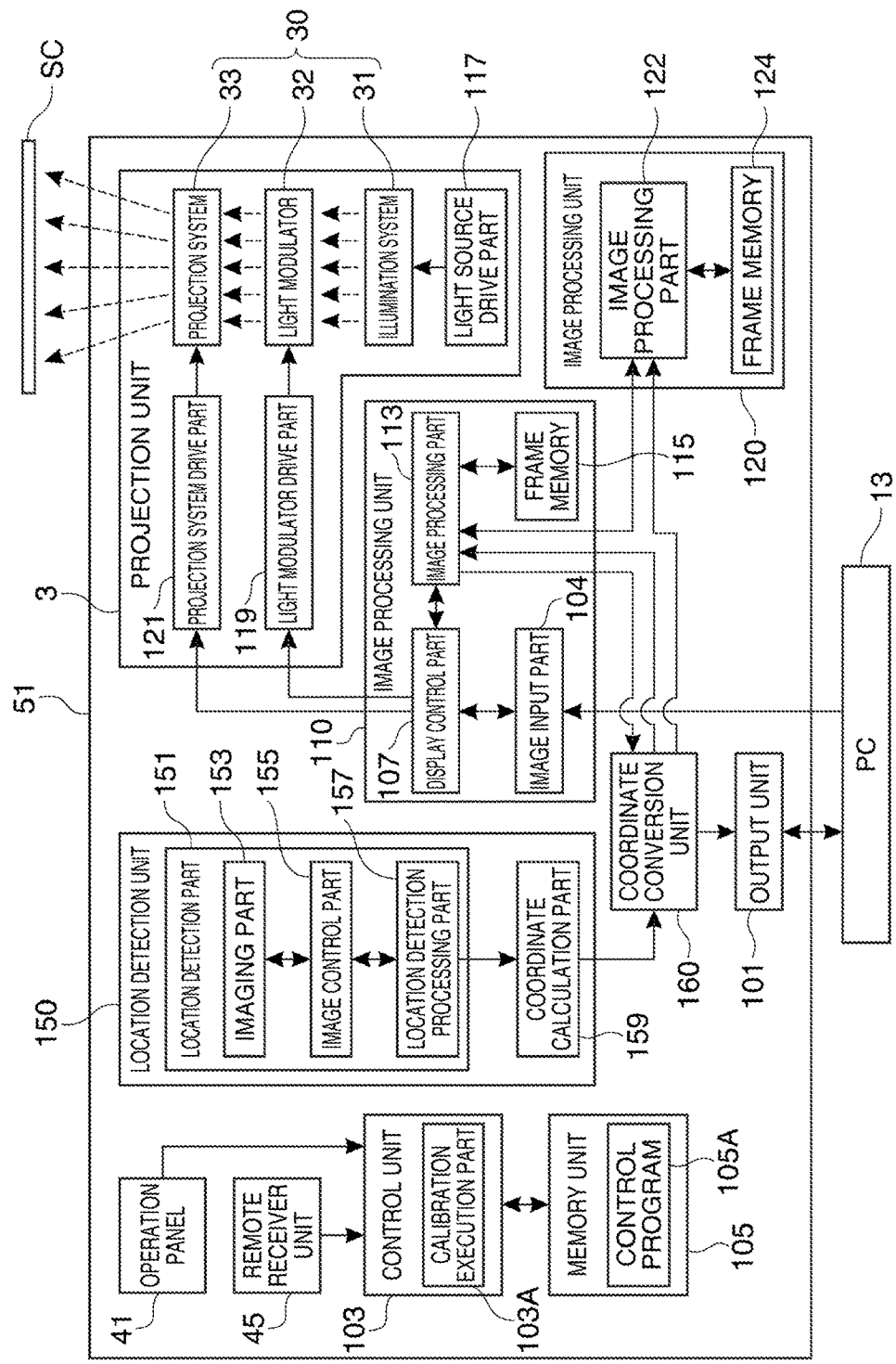
FIG. 10 is a block diagram showing a functional configuration of a projector as a modified example.

A projector 51 shown in FIG. 10 has the same respective functional parts as those of the projector 11 in the embodiment, and includes the image processing unit 120 that draws the pointer 12A, the menu bar 12B, etc. in response to the pointed location of the pointing tool 12. The image processing unit 120 includes an image processing part 122 that generates an image superimposed on image data according to the coordinates input from the coordinate conversion unit 160, and a frame memory 124 that develops data when the image processing part 122 generates the image.

When the coordinate conversion unit 160 outputs the converted coordinate data to the image processing unit 120, the image processing unit 120 draws images of the pointer 12A and the menu bar 12B using the image processing part 122, generates an image with the same resolution as that of the image developed by the display control part 107, and outputs the image to the image processing part 113. Here, the image output by the image processing part 122 includes the image of the pointer 12A, the menu bar 12B, or the like. The image processing part 113 combines the image input from the image processing part 122 with the image developed in the frame memory 115. Thereby, the image processing unit 120 may promptly display the pointer 12A or the menu bar 12B superimposed on the input image.

Further, in the configurations of the embodiments, the example in which the coordinate conversion unit 160 does not output the converted coordinates when the coordinates of the pointed location calculated by the coordinate calculation part 159 are out of the area in which the image data is displayed has been explained as an example, the invention is not limited to that. For example, when the projector 11 determines the type of the externally input signal, when the projector 11 temporarily stops the projected image, when the projector 11 interrupts image projection, or the like, the coordinate conversion unit 160 may not output the converted coordinates. Note that the projector 11 may interrupt image projection under the control of the control unit 103 when the projection system 33 is shielded by a movable shielding part (not shown) such as a shutter provided in front of the projector 11, when a command for interrupting image projection via the operation part such as the operation panel 41 or the remote is received, or the like.

Furthermore, in the configurations of the embodiments, the imaging part 153 and the image control part 155 of the location detection unit 150 may be replaced by a digital camera externally connected to the projector 11. The digital camera in this case may execute imaging under the control of the control unit 130 and output taken image data to the location detection processing part 157. A general-purpose interface such as a USB may be used as the interface connecting the digital camera and the projector 11, and the digital camera may be easily realized.

In addition, in the configurations of the embodiments, the pointing tool 12 is not limited to one having the rod shape or the pen shape, but, for example, a finger of the user may be used as the pointing tool 12 and its pointed location may be detected. Any of the finger of the user and a device other than the finger of the user may be detected as the pointing tool 12.

Further, in the configurations of the embodiments, the configuration in which the location detection unit 150 detects the pointed location by the pointing tool 12 based on the taken image data has been explained as an example, however, the invention is not limited to that. For example, a pressure-sensitive or capacitance touch panel may be provided on the screen SC as the display surface or a display screen in other display systems, and the touch panel may detect contact of the user's finger, a rod-like member, or the like as the pointing tool 12.

Furthermore, in the embodiments, the configuration in which the PC 13 and the projector 11 are wired-connected by a cable or the like has been explained as an example, however, the connection form between the projector 11 and the PC 13 is arbitrary. For example, the projector 11 and the PC 13 may be connected to each other via wireless communication using a wireless LAN or the like or wired communication using a general-purpose data communication cable such as a USB, a wired LAN, or the like, and may transmit and receive image data and coordinate data.

In addition, in the embodiments, the configuration in which the light modulator 32 uses the three transmissive or reflective liquid crystal display panels corresponding to the respective colors of RGB as unit that modulates the light generated by the light source has been explained, however, the invention is not limited to that. For example, a system combining one liquid crystal display panel and a color wheel, a system using three digital mirror devices (DMDs), a DMD system combining one digital mirror device and a color wheel, or the like may be employed. Here, in the case where only one liquid crystal display panel or DMD is used as the display unit, the member corresponding to the combining system such as the cross dichroic prism is unnecessary. Other devices than the liquid crystal display panel or the DMD may be employed without difficulty as long as they may modulate the light generated by the light source.

Further, the display device of the invention is not limited to the projector that projects images on the screen SC. The image display device of the embodiment of the invention includes various display devices such as self-emitting display devices of a liquid crystal monitor or a liquid crystal television that displays images on a liquid crystal display panel, a monitor device or a television receiver that displays images on a PDP (plasma display panel), or a monitor device or a television receiver that displays images on an organic EL panel called OLED (Organic Light-emitting diode), OEL (Organic Electro-Luminescence), or the like. In this case, the liquid crystal display panel, the plasma display panel, the organic EL display panel correspond to a display unit, and its display screen corresponds to the display surface. More specifically, the entire area in which images can be displayed corresponds to the effective projection area 11B and the projectable area 11A of the embodiments.

Furthermore, the respective functional parts of the projectors 11, 51 shown in FIGS. 2 and 10 and the respective functional parts of the PC 13 shown in FIG. 3 show functional configurations realized by cooperation of hardware and software, and the specific mounting form is not particularly limited. Therefore, it may be not necessary that hardware individually dealing with the respective functional parts is mounted, and obviously, one processor may execute programs and realize the functions of the plural functional parts. Or, part of the functions realized by software in the embodiments may be realized by hardware or part of the functions realized by hardware in the embodiments may be realized by software. In addition, specific detailed configurations of the other respective parts of the display system 10 including the projector 11 and the PC 13 may be arbitrarily changed without departing from the scope of the invention.

Further, the control program 105A that has been stored in the memory unit 105 in the embodiments may be downloaded from another device connected to the projector 11 via a communication network, or the control program 105A may be recorded in a portable recording medium and the respective programs may be read out from the recording medium and executed. Similarly, regarding the display control program 13A stored in the PC 13, the PC 13 may download the display control program 13A from another device and execute it or the PC 13 may read out the display control program 13A recorded in a portable recording medium and execute it.

Furthermore, in the embodiments, the configurations in which one pointing tool 12 is used has been explained as an example, however, the number of pointing tools is not limited in the invention. That is, the invention may use two or more pointing tools at the same time. In this regard, plural pointing tools 12 may be detected by one location detection unit 150, or all pointing tools 12 may be detected by location detection units 150 in the same number as the number of pointing tools or in the larger number than the number of pointing tools, the location detection unit 150 that can detect the user's finger as the pointing tool 12, or the location detection unit 150 that can detect another device than the user's finger as the pointing tool 12 may be provided. Not all of the location detection units 150 may be provided in the projector 11. For example, the projector 11 may include one location detection unit 150 and at least one location detection unit 150 may be provided outside of the projector 11.

In addition, in the embodiments, the configurations in which the location detection unit 150 detects the coordinates pointed by the pointing tool 12 have been explained, however, the information detected by the location detection unit 150 is not limited to the coordinates pointed by the pointing tool 12. The location detection unit 150 may detect other information which pointing devices (mouse, digitizer, and so on) can detect, and output the information to the PC 13. For example, same as devices included in USB HID (human interface device) class (mouse, digitizer, and so on), the location detection unit 150 may output the coordinate information and the other information (for instance, information which indicates whether the operation portion of the devices is operated or not). The projector 11 may output the coordinate information and the other information to the PC 13 via USB communication, a LAN, or the like, and the output method may be wired communication or wireless communication.

Further, in the embodiments, the configurations in which the projector 11 includes the location detection unit 150 have been explained as an example, however, all or part of the configuration corresponding to the location detection unit 150 may be realized by another device than the projector 11. For example, the projector according to the invention may be adapted to connect to a digital camera having functions corresponding to the imaging part 153 and the image control part 155 and may acquire taken image data from the digital camera. Furthermore, the location detection unit 150 may be another device than the projector 11 or the PC 13. In this case, the location detection unit 150 may be a device independent from the projector 11. In addition, the location detection unit 150 may further has a function corresponding to the coordinate conversion unit 160.

What is claimed is:

1. A display device comprising:
    an image input unit that receives image data from an image supply device;
    a display unit that displays a display image on a display surface based on the image data;
    a location detection unit that detects a pointed location with respect to the display image on the display surface;
    a coordinate calculation unit that calculates first coordinates as coordinates of the pointed location in a displayable area on the display surface;
    a drawing unit that draws an image based on the first coordinates calculated by the coordinate calculation unit; and
    an output unit that outputs coordinates to the image supply device based on the first coordinates.

2. The display device according to claim 1, further comprising:
    a coordinate conversion unit that converts the first coordinates calculated by the coordinate calculation unit into second coordinates as coordinates in the image data,
    wherein
        the output unit outputs the second coordinates obtained by the coordinate conversion unit.

3. The display device according to claim 2, wherein the coordinate conversion unit converts the first coordinates calculated by the coordinate calculation unit into the second coordinates based on image location information as information indicating a location of the display image with respect to the displayable area.

4. The display device according to claim 3, wherein the coordinate conversion unit converts the first coordinates calculated by the coordinate calculation unit into the second coordinates based on resolution of the image data.

5. The display device according to claim 2, wherein the location detection unit detects a location of a pointing tool on the display surface based on a taken image obtained by taking the display surface using an imaging unit, and thereby, detects the pointed location in the displayable area.

6. The display device according to claim 2, wherein the coordinate conversion unit uses coordinates of a location near the pointed location in the image data as converted coordinates when the pointed location is not contained in the display image.

7. The display device according to claim 2, wherein the coordinate conversion unit does not output converted coordinates when the pointed location is not contained in the display image.

8. The display device according to claim 2, wherein, when image processing is executed on the image data and a display mode of the display image on the display surface is changed, the coordinate conversion unit converts the first coordinates into the second coordinates based on the image location information changed in response to the display mode.

9. The display device according to claim 2, further comprising:

a display control unit that detects a location of the display image with respect to the displayable area.

10. The display device according to claim 1, further comprising:

a calibration execution unit that executes a calibration and obtains a correspondence relationship between coordinates in a taken image and coordinates in the displayable area on the display surface, the taken image being obtained by taking the display surface using an imaging unit.

11. The display device according to claim 1, wherein the output unit outputs coordinates to the drawing unit based on the first coordinates.

12. The display device according to claim 2, wherein the coordinate conversion unit converts the first coordinates calculated by the coordinate calculation unit into the second coordinates based on image location information as information indicating a location and a size of the display image with respect to the displayable area, and when image processing is executed on the image data, and the size of the display image with respect to the displayable area is changed, the coordinate conversion unit converts the first coordinates into the second coordinates.

* * * * *